United States Patent [19]

Dixon

[11] Patent Number: 4,687,582
[45] Date of Patent: Aug. 18, 1987

[54] METHOD AND APPARATUS FOR OPERATING AND REGENERATING ION EXCHANGERS

[76] Inventor: Walter O. Dixon, 470 N. 1020 West, Provo, Utah 84601

[21] Appl. No.: 798,056

[22] Filed: Dec. 23, 1985

[51] Int. Cl.$^4$ ............................................. B01J 49/00
[52] U.S. Cl. ................................... 210/677; 210/678; 210/269; 210/289
[58] Field of Search ............... 210/670, 677, 678, 269, 210/275, 278, 289, 291

[56] References Cited

U.S. PATENT DOCUMENTS 3,056,502 10/1962 Zwicky .............................. 210/283
3,531,401 9/1970 Crits .................................... 210/677

Primary Examiner—Ivars Cintins
Attorney, Agent, or Firm—Thorpe, North & Western

[57] ABSTRACT

Process for operating and regenerating a fixed bed ion exchanger on a continuous basis without the need for moving the bed or closing down the operation during the regeneration step which comprises forming a fluid wall of the feed solution containing the ions to be removed and continuously flowing the feed solution as a fluid wall through a fixed ion exchange bed at a high rate until the ion exchange bed becomes exhausted and in need of regeneration, then terminating the flow of feed solution and forming a fluid wall of a stripping solution which will remove the ions from the ion exchange resin and flowing the stripping solution as a fluid wall through the fixed ion exchange bed at a high rate until the activity of the bed has been restored, then terminating the flow of stripping solution and again forming a fluid wall of the feed solution and continuously flowing the feed solution as a fluid wall through the fixed ion exchange bed at a high rate. The above process effects a rapid and efficient recovery of the desired ions with minimal loss of resin through hydraulic action. Also provided is a highly efficient apparatus for conducting the above process including a plurality of valve means for introducing the solutions in sequence, means for forming the fluid wall of each solution, feed chamber means for passing the fluid wall into the ion exchange bed, means for maintaining the ion exchange bed, collection chamber means for collecting the fluid wall after passage through the ion exchange bed, means for removing the collected solutions and plurality of valve means for discharging the solutions in sequence.

19 Claims, 7 Drawing Figures

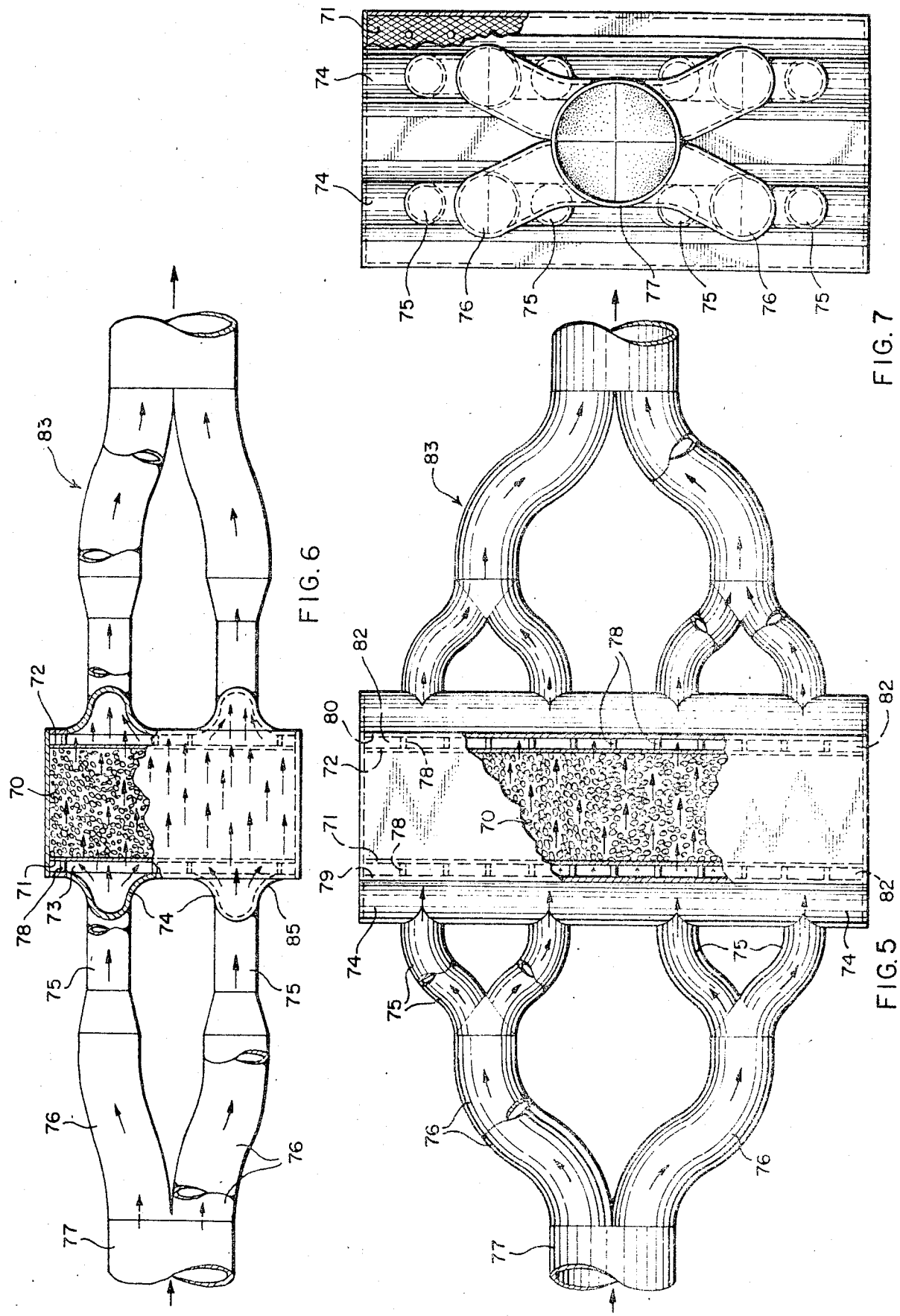

ions from solution. The need is particularly important in the extraction of low concentrations of rare metals from leach solutions in major industrial extraction processes. Such procedures would include the removal of copper, uranium, gold, silver, etc. from the streams containing such components such as may be found in the extractive metallurgy industry.

METHOD AND APPARATUS FOR OPERATING AND REGENERATING ION EXCHANGERS

BACKGROUND OF THE INVENTION

1. Field of the Invention

This invention relates to a new and improved method and apparatus for operating and regenerating ion exchangers.

More particularly, the invention provides a new process for operating and regenerating fixed bed ion exchangers on a continuous basis without the need for moving the bed or closing down operations during the regeneration step.

2. Prior Art

There is a need in industry, and particularly the metallurgy and water purification industry, for an efficient process for removing ions from solution. The need is particularly important in the extraction of low concentrations of rare metals from leach solutions in major industrial extraction processes. Such procedures would include the removal of copper, uranium, gold, silver, etc. from the streams containing such components such as may be found in the extractive metallurgy industry.

It has been found that certain inorganic materials, such as zeolites, and synthetic organic resins, such as styrene copolymers, having axionic or cationic functional groups, such as sulfonic acid groups, readily extract metallic ions and can be used successfully to remove low concentrations of ions from feed solutions. The synthetic resins of this type have been found to be particularly useful for this purpose and have found wide use in the hydrometallurgy industry, etc. Such resins, for example, are able to concentrate metals from leaching concentrations of 6 ppm up to a concentration of about 1200 ppm.

After a period of use, however, the ion exchange resins decrease in activity due to saturation of the resins with the ions removed and the bed is said to become exhausted. Before the beds can be used again they must undergo regeneration. This is generally accomplished by stopping the process, removing the resin bed to a second chamber where it may be scrubbed to remove the impurities and is treated with a stripping solution, such as nitric acid, to remove the ions attached to the synthetic resin.

Methods used in the past for the regeneration of ion exchangers are disclosed in U.S. Pat. Nos. 2,572,848, 3,193,198, 3,240,699 and 3,394,079. These procedures are limited, however, in that they either involve stopping the reaction for removal of the resin to a second location or circulating the resin which effects destruction of the resin during movement. Furthermore, there has been hydraulic destruction of the resin at the inlet port and/or outlet port of the ion exchange vessel when the fluid flow has not been restricted. Others use a countercurrent flow where the regenerating fluid flows countercurrent to the direction of flow of the feed.

OBJECTS AND SUMMARY OF THE INVENTION

It is an object of the invention, therefore, to provide a new and improved process for loading and regenerating ion exchange resin.

It is a further object to provide a new process for loading and regenerating ion exchange resin in a system which can be operated in a continuous manner without removal of the resin bed or stopping the process.

It is a further object to provide a new process for loading and regenerating ion exchangers which permits high flow rates with minimum loss of resin from hydraulic action.

It is a further object to provide a new process for operating and regenerating ion exchangers which gives a high yield of ion recovery from dilute solutions.

It is a further object to provide a new apparatus for loading and regenerating ion exchange resins which can be easily operated and economically produced.

It is a further object to provide a process for ion removal which is applicable to water purification, hydrometallurgy and other ion exchange process fields.

It has now been discovered that these and other objects may be accomplished by the process of the present invention which relates to a new technique for operating and regenerating a fixed ion exchange bed on a continuous basis without the need for moving the bed or closing down the operations. Specifically, the process of the invention comprises the steps of (i) introducing the feed solution containing the ions to be removed through open valve means into an open feed chamber which is along the side of the ion exchange bed but separated therefrom by a porous wall and forming a wall having a uniform flow front of feed solution therein, (ii) flowing the wall of feed solution formed in the said feed chamber through the fixed ion exchange bed for ion removal, (iii) collecting the spent feed solution at the opposite side of the bed in a collection chamber which is along the side of the bed but separated therefrom by a porous wall, (iv) continuously removing the spent feed solution in a continuous manner as described above until the bed becomes exhausted and in need of regeneration, (v) terminating the flow of feed solution at the inlet valve means and introducing through separate inlet valve means a stripping solution into the feed chamber to form a solution wall as noted above, (vi) flowing the wall of stripping solution formed in the feed chamber through the fixed ion exchange bed, (vii) collecting the spent stripping solution in the collection chamber as noted above, and (viii) as the stripping solution enters the collection chamber, closing the valved outlet means for the feed solution and opening the valved outlet means for the stripping solution, (ix) continuing the flow of stripping solution until the activity of the bed has been restored, (x) then terminating the flow of stripping solution at the inlet valve means and introducing through separate inlet valve means the feed solution into the feed chamber to form solution wall as above, (xii) flowing the wall of feed solution formed in the feed chamber through the fixed bed, (xiii) collecting the spent feed solution in the collection chamber noted above, and (xiv) as the feed solution enters the collection chamber, closing the valved outlet means for the stripping solution and opening the valved outlet means for the feed solution and (xv) continuing the passage of feed solution at a fast rate in the above manner until the bed becomes exhausted and (xvi) repeating the foregoing sequence of steps as noted above.

With certain feed solutions and ion exchange beds it is helpful during the regeneration step to flow a scrubbing solution through the ion exchange bed to remove impurities before the stripping solution is introduced. In this modification, after the introduction of the feed solution has been terminated, the scrubbing solution is introduced through a separate inlet valve means into the feed chamber noted above, the wall of scrubbing solution formed in the chamber is then flowed as a fluid wall through the ion exchange bed, the spent scrubbing solution is recovered in the collection chamber and discharged through the outlet valve means, as the scrubbing solution enters the collection chamber the said outlet valve is opened and the feed solution outlet valve is closed, continuing the flow of scrubbing solution until the cleaning has been completed and then closing the inlet valve for the scrubbing solution and opening the inlet valve for the stripping solution and continuing as noted above for the process of the invention.

Another preferred modification of the process of the invention, particularly as it relates to the efficient operation of the process, comprises collecting the spent stripping solution from the outlet valve means and taking it to a holding tank where it is retained for the next regeneration step needing a stripping solution. At the next regeneration, the collected spent stripping solution is introduced into the feed chamber in place of the fresh stripping solution and passed through the ion exchange bed and collected in the collection chamber. This step permits one to obtain more highly concentrated solutions of the desired ions than could be obtained heretofore. Near the end of the stripping action, fresh stripping solution is again passed into the feed chamber and through the ion exchange bed to insure thorough stripping of the ions.

Another preferred modification of the above-noted process which again relates to the efficient operation of the process comprises forming a separate feed chamber at the bottom of the ion exchange bed and a separate collection chamber at the top of the ion exchange bed and at the specified time introducing the scrubbing solution, stripping solution and spent stripping solution into the separate feed chamber so that the flow of the scrubbing, stripping and spent stripping solutions is substantially transverse to the flow of the feed solution, and then collecting these solutions at the separate collection chamber at the top of the ion exchange bed, the control of the valved inlet and outlet means being substantially the same as noted above for the process of the invention.

The invention further provides an apparatus for conducting the above-noted process of the invention including a plurality of valve means for solutions in sequence, means for forming the fluid wall into the ion exchange bed, means for maintaining the ion exchange bed, collection chamber means for collecting the fluid wall after passage through the ion exchange bed, means for removing the collected solutions and plurality of valve means for discharging the solutions in sequence.

For the operation of the preferred modification of the process of the invention involving the recycling of the spent stripping solution, the apparatus is modified so as to provide a holding tank means for collection of the spent stripping solution and inlet and outlet valve means for introducing and collecting the spent stripping solution.

For the operation of the modified process of the invention wherein the stripping solution, and if desired scrubbing solution and recyled stripping solution, are cycled through the ion exchange bed in a direction transverse to the direction of the feed solution, the apparatus is modified so as to provide separate inlet valve means for these solutions, means for communicating the solutions to a separate feed chamber at the bottom of the ion exchange bed and communication means for discharging the solutions from the collection chamber to the separate outlet means for each solution.

The process and apparatus of the present invention provides many advantages over the known processes and their apparatus. The process, for example, yields a very high flow rate accompanied by a very minimal loss of ion exchange resin through hydraulic action, and a very high recovery of the desired ions from the feed solution. In addition, the use of the stripping recycle step merits the production of ion solutions having very high concentrations.

BRIEF DESCRIPTION OF THE DRAWINGS

FIG. 5 is a side elevation view of an ion exchange apparatus embodying inlet and outlet flow lines of preferred dimension.

FIG. 6 is a top plan view of the apparatus of FIG. 5.

FIG. 7 is an end elevation view taken from either the right or left side of FIG. 5.

DETAILED DESCRIPTION OF THE INVENTION

While the process of the invention is described hereinafter with particular reference to the recovery of metal ions, and particularly heavy metal ions, such as copper, uranium, silver and the like, from aqueous solution using ion exchange resin beds, it will be apparent that the process can also be used to recover a variety of other ionic materials from other solutions using ion exchangers other than synthetic resins.

Figure 1:
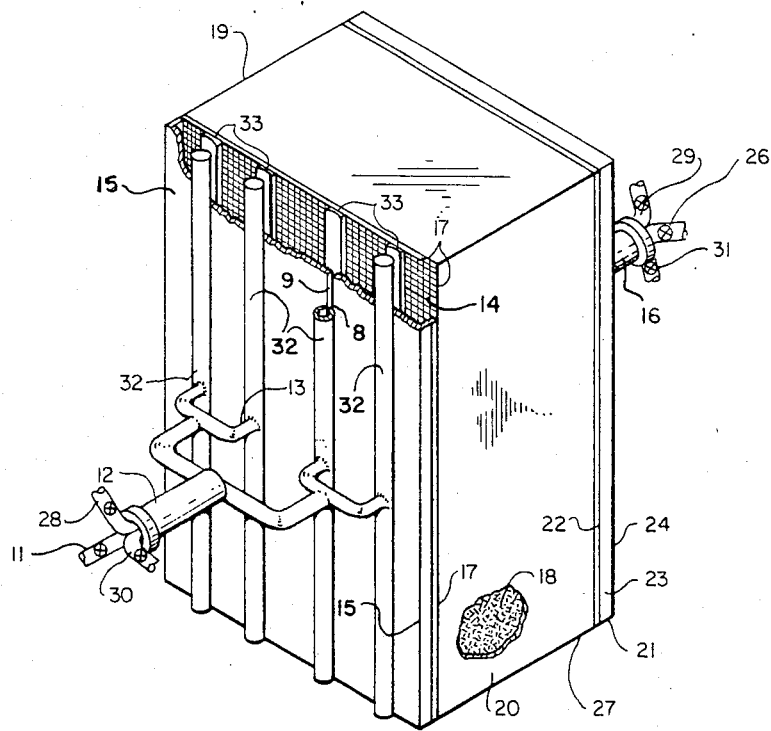
FIG. 1 is a perspective view of an apparatus for conducting the process of the invention and containing inlet valve means for the feed solution, scrubbing solution and stripping solution.

Referring now to FIG. 1 of the drawing, an apparatus for conducting the process of the invention comprises the following:

a. A plurality of valved inlet means 11, 28 and 30 provided for introducing feed solution 11, scrubbing solution 28, and stripping solution 30, said valved inlet means communicating from holding tanks (not shown) to branching feed ducts 12. The feed ducts are coupled to tubes 32 which have a longitudinal slot opening 8 lengthwise therein which is mounted at a corresponding elongated slot opening 9 in the hereinafter described first feed chamber wall 15 to permit fluid flow therethrough into said feed chamber to form a fluid wall of solution;

b. An elongated, fluid feed chamber 14 having inlet openings 9 disposed at separated distances along a first feed chamber nonporous wall 15 for coupling to said feed ducts to thereby complete a flow circuit from said inlet means, said feed chamber also including a second feed chamber wall 17 of highly porous material such as screen or wire mesh for permitting free flow of the said feed solution therethrough, said second feed chamber wall being disposed along one side of the ion exchange resin bed 18;

c. Opposing elongated, nonporous side walls 19 and 20, each being coupled at one side to said first resin retaining wall 15 and being adapted to partially enclose said fixed ion exchange resin bed;

d. A second porous resin retaining wall 22 attached to the nonporous side walls 19 and 20 to enclose said ion exchange resin bed, said second retaining wall 22 being adapted for free flow of said feed solution therethrough and also forming a first porous collection chamber wall;

e. An elongated fluid collection chamber 23 enclosed at one side by said porous collection chamber wall 22 and at another side by a second nonporous collection chamber wall 24 having outlet openings 25 disposed at separated distances therealong;

f. Branching collection ducts 16 coupled to said outlet openings 25 and having outlet valves 26 for feed solution, 29 for scrubbing solution and 31 for the stripping solution;

g. Base containment means 27 coupled near bottom edges of said porous and nonporous resin retaining walls for supporting said resin column;

h. Flow barriers 33 positioned within said feed chamber directly opposite said first feed chamber wall openings to deflect fluid flow away from said second feed chamber wall to enhance development of a fluid wall across the feed chamber.

Figure 2:
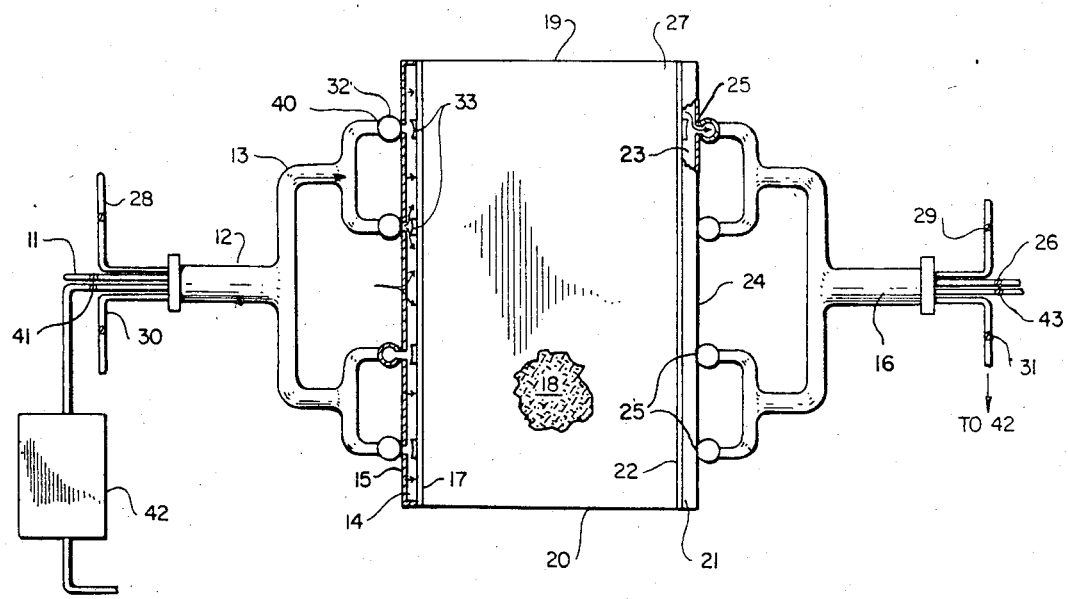
FIG. 2 is a top view of the apparatus shown in FIG. 1 containing an additional inlet valve means and outlet valve means for recycling stripping solution.

FIG. 2 shows a top view of the apparatus shown in FIG. 1 containing an additional inlet valve means 41 and outlet valve means 43 and flow tubing for recycling the stripping solution. The modification permits recovery of stripping solutions having a higher concentration of the desired ions. In FIG. 2, the additional inlet valve 41 and tubing for the recycled stripping solution communicated with a holding tank represented by 43. Not shown are the bracing fins to hold the resin well away from the steel frame and keep the feed chamber 14 clear and open.

Figure 3:
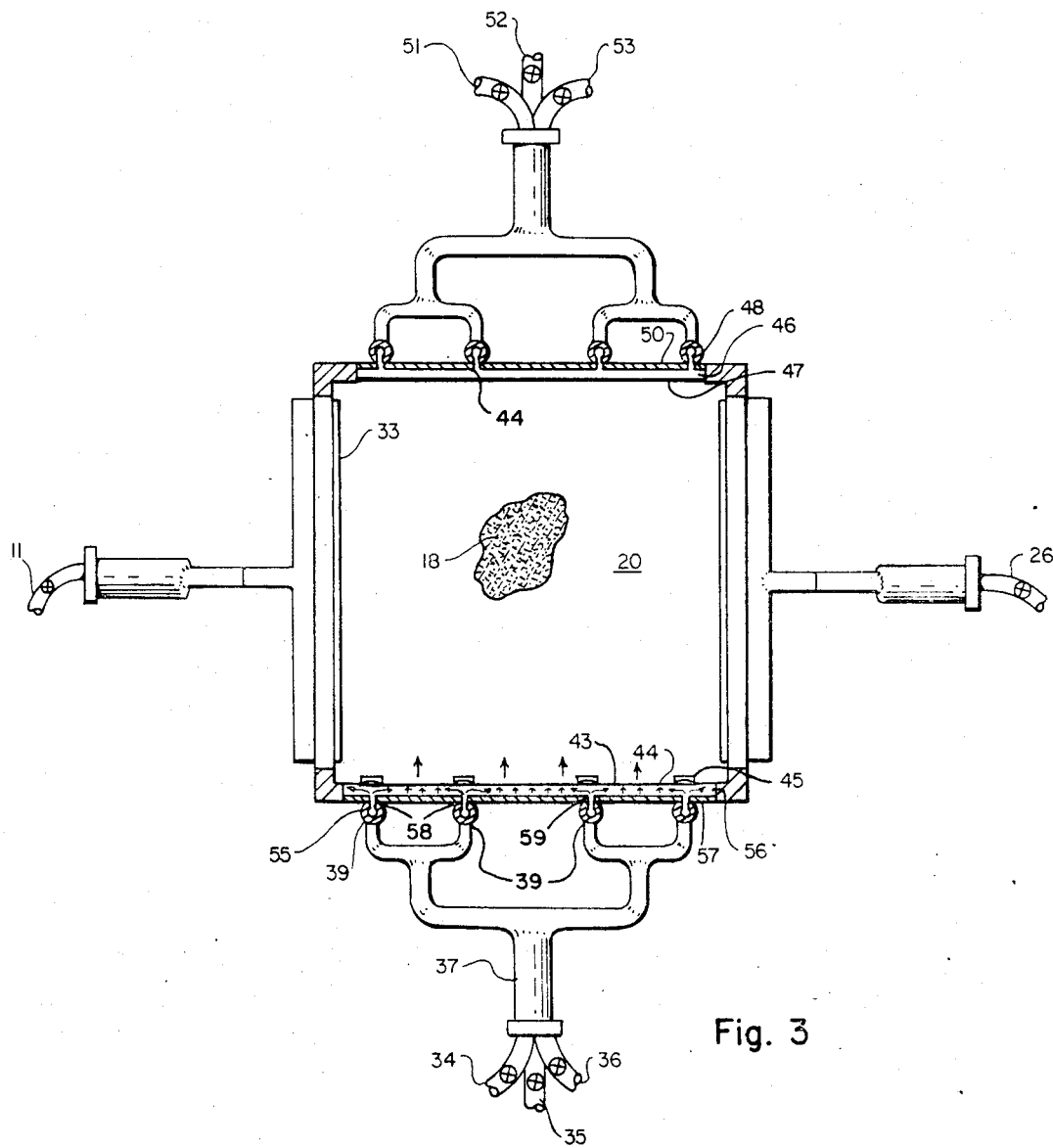
FIG. 3 is a side view of an apparatus to be used in the modified method of operating the process wherein the scrubbing solution, stripping solution and recycled stripping solution are passed through the ion exchange bed transverse to the flow of feed solution.

FIG. 3 (including cutaway sections of wall structure) represents a modified version wherein the scrubbing solution, stripping solution and recycled stripping solution are introduced at the bottom of the ion exchange bed so that they may flow perpendicular to the direction of the feeding solution. The modification comprises:

a. A plurality of valved inlet means 34, 35 and 36 provided for introducing the scrubbing solution, the stripping solution and the recycled stripping solution. The valved inlet means communicate with a fluid distribution means 37 which includes a plurality of feed ducts 39 having dispensing tubes 55 which have a longitudinal slot opening 58 lengthwise comunicating with feed chamber 56.

b. An elongated fluid feed chamber 56 has inlet openings 59 disposed at separated distances along the first feed chamber nonporous wall 57 for coupling to said feed ducts to thereby complete a flow circuit from said inlet means. The feed chamber also includes a second feed chamber wall 43 of highly porous material permitting free flow of the solutions therethrough. The second feed chamber wall is disposed along one side of the ion exchange bed 18 as a screen or mesh for retaining the ion exchange material within said bed. The porous wall is thereby adapted for fluid flow from the feed chamber to the resin bed.

c. A second porous resin retaining wall 47 is attached at the top of the ion exchange bed. The wall 47 is adapted for free flow of said feed solution therethrough and also forming a first porous collection chamber wall.

d. An elongated fluid collection chamber 46 is enclosed at one side by the porous collection chamber wall and at another side by a second nonporous collection chamber wall 50 having outlet openings 44 disposed at separate distances similar to previously described wall structure.

e. Collection ducts 48 are coupled to the outlet openings and have outlet means 51, 52 and 53 for the scrubbing solution, stripping solution and recycled stripping solution respectively.

f. Flow barriers 45 are positioned adjacent the feed chamber 56 directly opposite said first feed chamber wall openings 58 to deflect fluid flow away from the second feed chamber wall and into the feed chamber. This structure reduces localized intense flow rates in favor of a uniform flow front as represented by the small arrows in the feed chamber 56.

The ion exchange material used in the process of the invention may be any material having the ability to withdraw ions from solution. This includes inorganic products, such as zeolites as aluminum silicates, zirconium phosphates, hydrous oxides, such as aluminum hydroxide, heteropolyacids such as molydbophosphates and the like. Also included are the organic ion exchange products and particularly the cross-linked vinyl polymers containing the desired functional groups needed to attract the ions from solution. Particularly preferred are the cross-linked styrene polymers, and particularly those cross-linked with divinylbenzene containing the desired functional groups. For cationic exchange, preferred functional groups include sulphonic, carboxylic, arsenic, phosphonic, selenic and the like. Anionic exchange functional groups include primary, secondary and tertiary amines, quaternary amines, phosphines, tertiary sulphonium groups, and the like. Coming under special consideration are the styrene-divinyl benzene cross-linked polymers modified with sulphonic acid groups.

Selection of the resin will depend on the type of solution being treated. For example, the resin should not be soluble by the solution being passed through the apparatus. The ion exchange material is used as a fixed bed, i.e. is not moved during the process but the feed solution is passed through the bed.

The feed solution employed in the process may be any fluid medium containing the desired ions to be removed which can be pumped and forced through the ion exchange material under pressure. Suitable feed solutions comprise aqueous or solvent solutions containing the ions and particularly metalic ions such as calcium, magnesium, copper, uranium, gold, silver and the like.

The scrubbing solution used during the regeneration of the ion exchange material may be any suitable fluid material which is capable of removing the impurities in the ion exchange bed. Preferred solutions to be used for this purpose include dilute mineral acids of suitable concentrations.

The stripping solution used during the regeneration step is any suitable fluid material which has the ability to withdraw the ions attached to the ion exchange material. In general, the cation exchange beds are regenerated with dilute acid, e.g. 2% sulfuric acid or nitric acid. The anion exchange beds are preferably regenerated with dilute bases, e.g. 2% to 5% sodium hydroxide or sodium carbonate.

The feed solutions are passed through the ion exchange bed at a fast rate. Preferred high flow rates vary from about 8 to 23 CFM per square foot surface area with a six foot deep bed. The process yields many of the above-noted advantages using a high flow rate of about 23 cubic feet per minute per square foot resin bed surface area using a 6 foot bed depth of ion exchange resin. Flow rates may be much higher and may be limited only by contact time requirements between resin and fluid.

Figure 4:
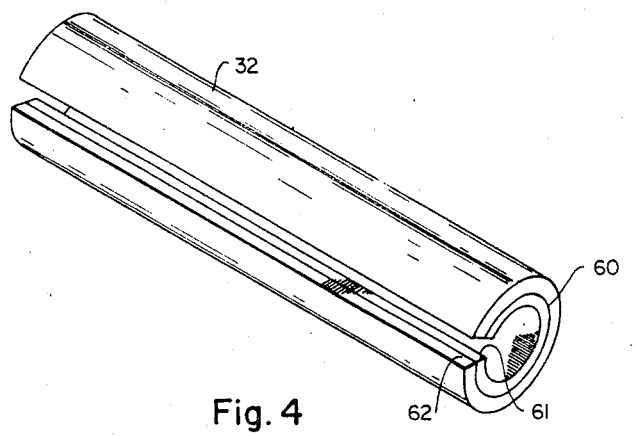
FIG. 4 is a perspective view of a variable control valve means for varying the flow of the solutions into the feed chambers and out into the collection chambers.

To assist in the control of the rate the solutions are passed through the resin bed one may utilize the variable control dispensing tubes 32 shown in FIG. 4. These tubes have a longitudinal slot opening 62 lengthwise which is mounted at a corresponding slot in the feed chamber wall. The tubes include a longitudinally slotted inner tube 60 which is rotated to vary the slotted opening formed between 61 and 62. Maximum flow will occur when the slot 61 of the inner tube 60 is fully exposed at the slot 62 of the dispensing tube 32. Lesser flow rates can be achieved by rotating the inner slot 61 off center of the outer slot 62.

To assist in the formation of the wall of fluid, the apparatus employs a flow barrier within the feed chamber directly opposite the inlet openings so as to deflect the fluid flow away from the porous chamber wall and into and throughout the feed chamber to form the fluid wall.

To help retain the ion exchange resin in the bed and reduce loss of resin, it is preferred to employ a protective screen in front of the porous walls of the feed chamber and the collection chamber. For example, when the porous wall has a porosity of 50 mesh screen or finer, the reinforcement screen preferably consists of an approximate number 6 mesh screen positioned against the 50 mesh screen away from the resin side (solid wall side).

In the preferred method of operating the process of the invention, the feed solution containing the ions to be removed is introduced through valve means 11 and flows through distribution means 12 to feed ducts 13 and is dispersed through tubes 32 into the elongated feed chamber 14. Barrier 33 deflects the fluid flow away from the feed chamber wall into the feed chamber. The feed solution forms a fluid wall in the feed chamber which flows out through porous wall 16 into and through the ion exchange bed 18. As the feed solution reaches the other side of the bed it goes through outlet openings 25 into collection ducts 16 and into the outlet valve 26. The flow of feed solution is continued in this manner until the bed becomes exhausted and is in need of regeneration.

The flow of feed solution is then terminated at valve 11 and valve 28 is opened for scrubbing solution. The scrubbing solution flows into the distribution means 12, through feed ducts 13 and is dispersed through tubes 32 into the elongated feed chamber 14. Hereagain the barrier 33 deflects the fluid flow away from the feed chamber wall into the feed chamber. The scrubbing solution now formed as a fluid wall in the chamber, flows out through porous wall 17 into and through the ion exchange bed 18. As the scrubbing solution reaches the other side of the bed it goes through outlet openings 25 into collection ducts 16 and into the outlet valve 29. As the scrubbing solution reaches the collection chamber, the valve outlet for the feeding solution 26 is closed and the outlet valve 29 for the scrubbing solution is opened. At the completion of the scrubbing step the flow of scrubbing solution at the inlet valve 28 is terminated and the inlet valve for the stripping solution 30 is opened.

The stripping solution flows into the distribution means 12 through feed ducts 13 and is dispersed through tube 32 into the elongated feed chamber. The barrier 33 deflects the fluid as noted above. The stripping solution, now formed as a fluid wall in the chamber, flows out through porous wall 17 into and through the ion exchange bed 18. As the stripping solution reaches the other side of the bed it goes through outlet openings 25 into collection ducts 13 and into the outlet valve 31. As the stripping solution reaches the collection chamber, the valve outlet for the scrubbing solution 29 is closed and the outlet valve 31 for the stripping solution is opened. At the completion of the stripping step the flow of stripping solution at the inlet valve 30 is terminated and the inlet valve for the feeding solution is opened.

The feed solution reaches the collection chamber, the outlet valve for the stripping solution 31 is closed and the outlet valve for the feed 26 is opened and the process continued in that manner until regeneration is needed and the scrubbing and stripping solutions again introduced as noted above.

The modified process wherein stripping solution is recycled as in FIG. 2, is operated in the same manner with the exception that the recycled stripping solution is introduced before the clean stripping solution. The other modified process wherein the scrubbing, stripping and recycled stripping solution are introduced at the bottom of the ion exchange bed and their flow is upward transverse to the flow of the feed solution is operated in the same manner as above with the exception that the introduction of the scrubbing, stripping and recycled stripping solution is introduced through the separate feed chamber 56 and the fluids are received in collection chamber 46 at the top of the ion exchange bed.

The invention may be embodied in other specific forms without departing from the spirit or essential characteristics of the invention. For example, FIGS. 5, 6 and 7 illustrate an alternative embodiment having a more preferred flow system. The resin is retained in packed configuration by mesh walls 71 and 72. These walls are rigidly supported by retaining braces 78 and rigid wall structure 79 and 80. Mesh wall 71 forms the right wall of feed compartment 73 which is enclosed by wall structure 74. This wall structure 74 merges with conduit which forms the fluid distribution line comparable to item 12 in FIG. 1. Conduit diameters diverge from approximately $12\frac{3}{4}$ inches at 75, to 18 inches at 76 and 36 inches at 77. Fluid collection occurs in the collection chamber 82 and flows out through collection conduit 83. Similar dimensional enlargements apply to this conduit as with the distribution conduit at 75, 76 and 77. Rounded corners 85 are used at all junctions to reduce turbulence. This flow system operates to establish a uniform flow front within the packing material 70 which greatly enhances the overall operation of the system.

The present embodiment is, therefore, to be considered in all respects as illustrative and not restrictive, the scope of the invention being indicated by the appended claims rather than by the foregoing description and all changes that come within the meaning and range of equivalency of the claims are therefore to be embraced therein.

I claim:

1. A process for operating and regenerating a fixed bed ion exchanger on a continuous basis without the need for moving the bed or closing down the operation during regeneration, said process comprising the steps of:

forming a fluid wall of the feed solution having a substantially uniform flow front and containing the ions to be removed and continuously flowing the feed solution as a fluid wall through a fixed ion exchange bed at a high rate of at least 8 cubic feet per minute per square foot of resin bed surface area exposed to and resisting flow of the fluid wall until the ion exchange bed becomes exhausted and in need of regeneration;

terminating the flow of feed solution and forming the fluid wall of a stripping solution which will remove the ions from the ion exchange bed and flowing the stripping solution as the fluid wall through the fixed ion exchange bed at the high rate until the activity of the bed has been restored;

terminating the flow of stripping solution and again forming the fluid wall of the feed solution and continuously flowing the feed solution as the fluid wall through the fixed ion exchange bed at the high rate.

2. A process in claim 1 comprising the added step of forming a scrubbing solution as a fluid wall and passing the same through the ion exchange bed following the termination of the flow of feed solution but before the introduction of the stripping solution.

3. A process as in claim 1 comprising the added step of forming a recycled stripping solution as the fluid wall and passing the same through the ion exchange bed prior to the introduction of the clean stripping solution.

4. A process as in claim 1 wherein the stripping solution step includes passing the stripping solution through the ion exchange bed as the fluid wall in a direction transverse to the direction of flow of the feed solution.

5. A process for operating and regenerating a fixed bed ion exchanger in a continuous manner which comprises the steps of:

introducing feed solution containing ions to be removed through valve means into a feed chamber which is along the side of the ion exchange bed but separated therefrom by a porous wall forming a fluid wall of said solution having a substantially uniform-flow track; flowing the wall of feed solution formed in the said feed chamber through the fixed ion exchange bed, collecting the feed solution at the opposite side of the bed in a collection chamber which is along the side of the bed but separated therefrom by a porous wall, continuously removing the feed solution from the collection chamber through a valve means, continuing the flow of feed solution in a continuous manner as described above until the ion exchange bed becomes exhausted and in need of regeneration, then terminating the flow of feed solution at the inlet valve means and introducing through a separate inlet valve means a scrubbing solution into the feed chamber noted above;

introducing scrubbing solution into the feed chamber and forming the fluid wall thereof, flowing the wall of scrubbing solution through the fixed ion exchange bed, collecting the scrubbing solution in the collection chamber noted above, and as the scrubbing solution enters the collection chamber, closing a valved outlet means for the feed solution and opening a valved outlet means for the scrubbing solution, at the completion of the scrubbing step terminating the flow of scrubbing step terminating the flow of scrubbing solution at the inlet valve means;

introducing through separate inlet valve means a stripping solution and forming the fluid wall thereof in the feed chamber noted above, flowing the wall of stripping solution formed in the feed chamber through the fixed ion exchange bed, collecting the stripping solution in the collection chamber noted above, and as the stripping solution enters the collection chamber, closing the valved outlet means for the scrubbing solution and opening the valved outlet means for the stripping solution;

at the completion of the stripping step terminating the flow of stripping solution at the inlet valve means and introducing through separate valve means the feed solution into the feed chamber and forming the fluid wall as noted above; flowing the wall of feed solution formed in the feed chamber through the fixed ion exchange bed, collecting the feed solution in the collection chamber noted above, and as the feed solution enters the collection chamber, closing the valved outlet means for the stripping solution and opening the valved outlet means for the feeding solution and continuing the passage of feed solution in the above manner until the bed becomes exhausted and then repeating the regeneration.

6. A process as in claim 5 including the step of forming recycled stripping solution as the fluid wall and passing the same through the ion exchange bed prior to the introduction of the clean stripping solution.

7. A process as in claim 5 including the steps of forming the scrubbing solution and stripping solution as fluid walls and passing each separately through the ion exchange bed in a direction transverse to the direction of flow of the feed solution.

8. A fixed bed ion exchange apparatus for use with a fixed column of ion exchange material, said apparatus comprising:

a. valved inlet means adapted for providing continuous flow of feed solution containing ions to be removed and including a fluid distribution means having a plurality of feed ducts communicating therefrom;

b. an elongated, fluid feed chamber having inlet openings disposed at separated distances with respect to a first feed chamber nonporous wall for coupling to outlets from said feed ducts to thereby complete a flow-circuit from said inlet means, said feed chamber also including a second feed chamber wall of highly porous material permitting free flow of said feed solution therethrough, said second feed chamber wall being disposed along one side of and being substantially co-extensive with the fixed column of ion exchange material and possessing means for retaining the ion exchange material within a packed resin bed configuration, said porous wall being adapted for fluid flow from said feed chamber to said resin bed;

c. flow barrier means positioned opposite the inlet openings as part of the feed chamber to deflect fluid flow away from said second chamber wall and into said feed chamber;

d. opposing elongated, nonporous ion exchange material retaining side walls, each being coupled at one side to said first resin retaining wall and being adapted to partially enclose said fixed ion exchange material column bed;

e. a second porous ion exchange material retaining wall attached at an opposing side from said first nonporous retaining wall to laterally enclose said ion exchange material bed, said second retaining wall being adapted for free flow of said feed solution therethrough and also forming a first porous collection chamber wall;

f. an elongated fluid collection chamber enclosed at one side by said first porous collection chamber wall and at an opposing side by a second nonporous collection chamber wall having outlet openings disposed at separated distances therealong;

g. collection ducts coupled to said outlet openings and having outlet means to provide uniform fluid transfer from said collection chamber;

h. base containment means coupled to bottom edges of said porous and nonporous retaining walls for supporting said ion exchange material column;

i. valved inlet means adapted for providing flow of a stripping solution which will remove the ions from the ion exchange material, said valved inlet means being coupled to the fluid distribution means defined in (a) above such that when the valve is opened the stripping solution can flow through the feed ducts coupled to the feed chamber; and j. valved outlet means adapted for removal of the stripping solution from the collection chamber and collection ducts defined in (f) and (g) above.

9. A fixed bed ion exchange apparatus as defined in claim 8 possessing a valved inlet means adapted for providing flow of a scrubbing solution which will remove impurities from the ion exchange material, said valved inlet means being coupled to the fluid distribution means defined in (a) above such that when the valve is opened the scrubbing solution can flow through the feed ducts coupled to the feed chamber; and also possessing valved outlet means adapted for removal of the scrubbing solution from the collection chamber and collection ducts defined in (e) and (f) of claim 8.

10. A fixed bed ion exchange apparatus as defined in claim 8 possessing a valved inlet means adapted for providing a flow of a recycled stripping solution, said valved inlet means being coupled to the fluid distribution means defined in (a) above such that when the valve is opened the recycled stripping solution can flow through the feed ducts coupled to the feed chamber; and also possessing valved outlet means adapted for removal of the recycled stripping solution from the collection chamber and collection ducts defined in (e) and (f) of claim 8.

11. Apparatus as defined in claim 8 modified so as to permit transverse flow of the stripping solution by introduction of the stripping solution at the bottom of the ion exchange bed, said modification comprising:

a. valved inlet means adapted for providing flow of stripping solution including a fluid distribution means having a plurality of feed ducts communicating therefrom, and being coupled to a base mounted elongated fluid feed chamber having inlet openings disposed at separate distances along a first feed chamber nonporous wall and coupled to said feed ducts, said feed chamber also including a second feed chamber wall of highly porous material permitting free flow of said stripping solution therethrough, said second feed chamber wall being disposed along the bottom of the ion exchange material bed and possessing said porous wall being adapted for fluid flow from said feed chamber to said resin bed;

b. a second porous ion exchange material retaining wall attached at the top of the ion exchange material bed and being adapted for free flow of said stripping solution therethrough and also forming a first porous collection chamber wall;

c. an elongate fluid collection chamber enclosed at the bottom by said first porous collection chamber wall and at the top by a second nonporous collection chamber wall having outlet openings disposed at separate distances therealong;

d. collection ducts coupled to said outlet openings and having outlet means to provide uniform fluid transfer from said collection chamber.

12. An apparatus as defined in claim 8 modified so as to permit transverse flow of stripping solution, recycled stripping solution and scrubbing solution by introduction of these solutions at the bottom of the ion exchange bed, said modification comprising:

a. valved inlet means adapted for providing flow of stripping solution, valved inlet means adapted for providing flow of recycled stripping solution, and valved inlet means adapted for providing flow of scrubbing solution, said three valved inlet means having common fluid distribution means having a plurality of feed ducts communicating therefrom and being coupled to a base mounted elongated fluid free chamber having inlet openings disposed at separate distances along a first feed chamber nonporous wall and coupled to said feed ducts, said feed chamber also including a second feed chamber wall of highly porous material permitting free flow of said stripping solution therethrough, said second feed chamber wall being disposed along the bottom of the ion exchange material within the said bed, said porous wall being adapted for fluid flow from said feed chamber to said resin bed;

b. a second porous ion exchange material retaining wall attached at the top of the ion exchange material bed and being adapted for free flow of said solutions therethrough and also forming a first porous collection chamber wall;

c. an elongated fluid collection chamber enclosed at the bottom of said porous collection chamber wall and at the top of said porous collection chamber wall and at the top by a second nonporous collection chamber wall having outlet openings disposed at separate distances therealong;

d. collection ducts coupled to said outlet openings and having a stripping solution outlet valve means, a recycled stripping solution outlet valve means and a scrubbing solution outlet valve means to provide uniform fluid transfer from said collection chamber.

13. An apparatus as in claim 8 wherein said porous wall is comprised of number 50 mesh screen or finer, and has a reinforcement screen of approximate number 6 mesh positioned on the feed chamber side of the said porous wall, and on the collecting chamber side of the collecting porous wall.

14. An apparatus as in claim 8 wherein said collection chamber porous wall is comprised of mesh screen capable of restraining resin particles but allowing fluid flow therethrough.

15. An apparatus as in claim 8 wherein said feed chamber and collection chambers are approximately equal in dimensions.

16. An apparatus as defined in claim 8 wherein the flow barrier means are positioned within said feed chamber directly opposite said first feed chamber wall openings to deflect fluid flow away from said second chamber wall and into the feed chamber.

17. Apparatus as in claim 8 wherein said elongate feed chamber has height and width dimensions in approximate 2:1 ratio, said nonporous side walls having an approximate height to width ratio of 2:1 or less.

18. Apparatus as defined in claim 8 wherein the feed chamber has height and width dimensions of approximately 10 feet and 5 feet or greater respectively.

19. Apparatus as in claim 8 wherein said fluid distribution means includes dispensing tubes having a longitudinal hinge attachment which permits rotation of said dispensing tubes out of attachment at slotted wall openings providing access to slotted openings in the chamber wall and dispensing tubes.

* * * * *